(12) United States Patent
Luetzeler et al.

(10) Patent No.: US 8,535,811 B2
(45) Date of Patent: *Sep. 17, 2013

(54) TRANSPARENT MOLDING COMPOSITION

(75) Inventors: Kirsten Luetzeler, Muenster (DE);
Franz-Erich Baumann, Duelmen (DE);
Sonja Bollmann, Haltern am See (DE);
Andreas Dowe, Borken (DE); Roland Wursche, Duelmen (DE); Georg Schaefer, Datteln (DE)

(73) Assignee: Evonik Degussa GmbH, Essen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/150,683

(22) Filed: Jun. 1, 2011

(65) Prior Publication Data

US 2011/0244209 A1  Oct. 6, 2011

Related U.S. Application Data

(63) Continuation of application No. 11/448,913, filed on Jun. 8, 2006, now Pat. No. 8,003,201.

(30) Foreign Application Priority Data

Jun. 8, 2005  (DE) .................. 10 2005 026 264

(51) Int. Cl.
*B32B 27/00* (2006.01)
*B32B 27/34* (2006.01)

(52) U.S. Cl.
USPC ..... 428/475.5; 428/220; 428/332; 428/474.4; 428/477.7; 524/538; 525/432

(58) Field of Classification Search
USPC ................ 428/220, 332, 474.4, 475.5, 477.7; 525/432; 524/538
See application file for complete search history.

(56) References Cited

U.S. PATENT DOCUMENTS

| | | | |
|---|---|---|---|
| 3,799,899 A | 3/1974 | Feinauer et ql | |
| 5,437,755 A * | 8/1995 | Lavorel et al. ................. | 156/240 |
| 6,335,101 B1 | 1/2002 | Haeger et al. | |
| 6,355,358 B1 | 3/2002 | Boer et al. | |
| 6,783,821 B2 | 8/2004 | Ries et al. | |
| 6,794,048 B2 | 9/2004 | Schmitz et al. | |
| 7,135,525 B2 | 11/2006 | Petter et al. | |
| 7,148,286 B2 | 12/2006 | Baumann et al. | |
| 7,317,044 B2 | 1/2008 | Monsheimer et al. | |
| 2002/0128386 A1 | 9/2002 | Montanari et al. | |
| 2002/0142118 A1 | 10/2002 | Schmitz et al. | |
| 2002/0179888 A1 * | 12/2002 | Montanari et al. ............ | 252/500 |
| 2003/0162899 A1 | 8/2003 | Baumann et al. | |
| 2004/0102539 A1 | 5/2004 | Monsheimer et al. | |
| 2004/0106691 A1 | 6/2004 | Monsheimer et al. | |
| 2004/0137228 A1 | 7/2004 | Monsheimer et al. | |
| 2004/0232583 A1 | 11/2004 | Monsheimer et al. | |
| 2005/0014842 A1 | 1/2005 | Baumann et al. | |
| 2005/0027050 A1 | 2/2005 | Monsheimer et al. | |
| 2006/0071359 A1 | 4/2006 | Monsheimer et al. | |
| 2006/0083882 A1 | 4/2006 | Schmitz et al. | |
| 2006/0134419 A1 | 6/2006 | Monsheimer et al. | |
| 2006/0189784 A1 | 8/2006 | Monsheimer et al. | |
| 2006/0202395 A1 | 9/2006 | Monsheimer et al. | |
| 2006/0223928 A1 | 10/2006 | Monsheimer et al. | |
| 2006/0244169 A1 | 11/2006 | Monsheimer et al. | |
| 2006/0281873 A1 | 12/2006 | Alting et al. | |
| 2006/0292387 A1 | 12/2006 | Kuhmann et al. | |
| 2007/0013108 A1 | 1/2007 | Monsheimer et al. | |
| 2007/0036998 A1 | 2/2007 | Dowe et al. | |
| 2007/0126159 A1 | 6/2007 | Simon et al. | |
| 2007/0166560 A1 | 7/2007 | Wursche et al. | |
| 2007/0182070 A1 | 8/2007 | Monsheimer et al. | |
| 2007/0183918 A1 | 8/2007 | Monsheimer et al. | |
| 2007/0197692 A1 | 8/2007 | Monsheimer et al. | |
| 2007/0232753 A1 | 10/2007 | Monsheimer et al. | |
| 2007/0238056 A1 | 10/2007 | Baumann et al. | |
| 2008/0116616 A1 | 5/2008 | Monsheimer et al. | |
| 2008/0119632 A1 * | 5/2008 | Baumann et al. ............. | 528/328 |
| 2008/0166496 A1 | 7/2008 | Monsheimer et al. | |
| 2008/0213552 A1 | 9/2008 | Hager et al. | |
| 2008/0217821 A1 | 9/2008 | Goring et al. | |
| 2008/0249237 A1 | 10/2008 | Hager et al. | |
| 2008/0261010 A1 | 10/2008 | Wursche et al. | |
| 2009/0044906 A1 | 2/2009 | Goring et al. | |
| 2009/0286096 A1 | 11/2009 | Alting et al. | |
| 2010/0055425 A1 | 3/2010 | Luetzeler et al. | |
| 2010/0221551 A1 | 9/2010 | Wursche et al. | |
| 2011/0045269 A1 | 2/2011 | Wursche et al. | |

FOREIGN PATENT DOCUMENTS

| | | |
|---|---|---|
| DE | 2044105 | 3/1972 |
| DE | 2152194 | 4/1973 |
| DE | 295 19 867 U1 | 3/1997 |
| DE | 103 33 005 A1 | 2/2005 |
| EP | 0 285 071 | 10/1988 |
| EP | 0 779 084 | 6/1997 |
| EP | 0 949 120 A1 | 10/1999 |
| EP | 1 329 481 A2 | 7/2003 |
| WO | WO 94/03337 | 2/1994 |
| WO | WO 2005/105891 | 11/2005 |

OTHER PUBLICATIONS

M. Beyer and J. Lohmar, Publikation, "Schön und robust—Schutz- und Dekorfolien aus Polyamiden", Kunststoffe 90 (2000) 1, pp. 98-101.
esp@cenet—English abstract of DE29519867.
esp@cenet —English abstract of DE 103 33 005.
esp@cenet—English abstract of 2044105.
esp©cenet—English abstract of DE2152194.
M. J. Zhang, et al., "Crack growth mechanism in some polyamides", Polymer, XP-002398074, vol. 29, No. 12, Dec. 1988, pp. 2152-2158.

\* cited by examiner

*Primary Examiner* — Ana Woodward
(74) *Attorney, Agent, or Firm* — Oblon, Spivak, McClelland, Maier & Neustadt, L.L.P.

(57) ABSTRACT

A polyamide molding composition which can be used for production of a printable or printed item contains a) at most 90 parts by weight of a polyamide obtained from a lactam or from an amino carboxylic acid having at least 10 carbon atoms; and b) from 10 to 100 parts by weight of PA1010, wherein a total of components a) and b) is 100 parts by weight.

19 Claims, No Drawings

TRANSPARENT MOLDING COMPOSITION

BACKGROUND OF THE INVENTION

1. Field of the Invention

The present invention relates to a transparent molding composition comprising a polyamide blend and being suitable for production of transparent, printable items.

2. Description of the Related Art

The current standard process for decoration of external areas on automobiles is painting. However, this procedure firstly generates high manufacturing costs, resulting from provision of specific plant and the operating cost associated therewith for the automobile producer, and secondly causes pollution of the environment. Pollution of the environment derives by way of example from solvent constituents released from the paints used, and also from accumulation of paint residues, which have to follow correct disposal routes.

Another factor is that painting has only limited suitability for decorating the surfaces of plastics components, which in recent years have become more popular in automobile construction, because of the saving in weight and cost.

The process of painting plastics components which are components of bodywork can, for example, be carried out on-line, the plastics part being subjected to a paint treatment identical with that for the metallic components. This leads to a uniform color, but is attended by high temperatures resulting from the cathodic electrodeposition method conventional here, and this makes the selection of material more difficult. In addition, identical adhesion of the paint formulation has to be ensured on very different substrates. If the process of painting the plastics parts is carried out in a separate step (known as off-line painting), comprising process conditions more advantageous for plastics, the problem of colormatching arises, meaning that the shade achieved on the metal has to be matched precisely. However, the differences in substrate and in the underlying paint formulation that can be used, and process conditions, make this very difficult to achieve. If there is a color difference prescribed via the design, a serious disadvantage that remains is provision of a second set of painting equipment for the plastics parts and the cost associated therewith, and additional time required for manufacture of the automobile also has to be considered. Direct use of the untreated, generally injection-molded plastics parts is aesthetically disadvantageous, because surface defects resulting from the process, such as weld lines, air inclusions, and also necessary reinforcing fillers, such as glass fibers, are clearly discernible here. This is intolerable in visible regions. Consequently, improvement of surface quality has to be undertaken, for example in the context of a painting process, frequently requiring much work for pretreatment via polishing and application of relatively thick layers of a primer.

One proposed solution consists in the use of multilayer plastics films, used to cover the components and then requiring no painting. The bond between substrate and decorating film here can be achieved via a number of manufacturing processes. By way of example, the film can be laminated to the substrate, or it is possible to select a process of in-mold coating by an injection-molding process, in which the film is placed in the injection mold during component production. The concept of a film as carrier of decoration is also in line with a trend toward individualization of design elements on automobiles. Specifically, this trend leads to a wider range of models in the manufacturing process, but with a reduction in the number of respective components manufactured per series. The use of films permits rapid, problem-free design change, and can therefore meet this challenge. An important factor here is that the film complies with the standards demanded in the automobile industry with respect to surface properties (class A surface), solvent resistance, and appearance. Films with these properties likewise have good capability for use in the design of interior surfaces in automobiles.

Decorative films of this type are in principle known. EP 0 949 120 A1 describes by way of example decorative films with a transparent outer layer comprising polyurethane, polyacrylate, fluoropolymer, or mixtures comprising fluoropolymer and polyacrylate. WO 94/03337 and EP 0 285 071 A2 disclose similar decorative films.

The utility model DE 295 19 867 U1 describes a decorable film comprising a copolyamide, which comprises the following monomer units: laurolactam, and also caprolactam, and/ or hexamethylenediamine/dicarboxylic acid. Although these copolyamides are generally transparent and are also easy to decorate, problems constantly occur during extrusion to produce moldings or films from copolyamides of this type. In particular, deposits form on the injection mold or extrusion die or on the take-off rolls, and the necessary cleaning work often interrupts production. Furthermore, films of this type have inadequate heat resistance, and there is therefore a risk of deformation during decoration by means of sublimation print or thermal diffusion print. The temperature at which decoration has to be carried out is therefore lower than would actually be desirable in these processes. An excessive proportion of short-chain comonomers moreover leads to undesirably high water absorption of the films produced therefrom, causing unacceptable warpage of the finished parts on exposure to moisture. One application sector for decorative films is as carriers of decoration for example for topcoats of sports equipment, such as skis or snowboards, or of household items. Here, single-layer films are often used, printed on the top- or underside.

In the article by M. Beyer and J. Lohmar, Kunststoffe 90 (2000) 1, pp 98-101, examples of printable films comprising PA12 molding compositions are given, but films of this kind have disadvantages with regard to surface gloss and inadequate heat resistance.

SUMMARY OF THE INVENTION

It was an object of the present invention to provide a molding composition which on the one hand has sufficient crystallinity to achieve adequate stress cracking resistance but which on the other hand is nevertheless sufficiently transparent. Sufficient stress cracking resistance is important firstly if the moldings or films manufactured from the material are also intended for decoration by screen printing or by offset printing as an additional or alternative process, and secondly in subsequent use if the finished parts are treated with alcohol-based cleaning compositions. Transparency must be adequate to permit reverse printing of the film with sufficient character sharpness. Furthermore, the molding composition should at least permit markedly reduced warpage, via low water absorption.

Another substantial aspect of the underlying object consisted in providing a polyamide molding composition which can be processed to give items, such as moldings or films, which have good printability by processes including thermal diffusion print or sublimation print. These thermal print processes often require that the films or moldings have increased heat resistance, and also that they do not have excessive water content. In the case of the molding compositions under consideration here, the heat resistance correlates with the crystallite melting point $T_m$; a $T_m$ of at least 180° C. is desirable for these thermal print processes. Excessively low heat resistances become apparent in warpage or deformation of the moldings or films to be printed. On the other hand, lowering of the sublimation temperature impairs contrast and character sharpness of the printed image, because the ink does not then penetrate sufficiently deeply into the film. If the films or moldings absorb too much moisture, undesired blistering can occur in thermal diffusion print. It is self-evident to the person skilled in the art that superficial ink residues that have not diffused into the material cannot be permitted to impair firm adhesive bonding to the substrate, e.g. to the ski body, or to impair capability for in-mold coating by an injection-molding process.

The printed item is often required to have a certain surface gloss, and no impairment of this can be permitted on exposure to cleaners, or even simply on mechanical abrasion of the items. Furthermore, exposure to mechanical effects such as shock, impact, scratching, or flexural cycles, cannot be permitted to cause formation or propagation of cracks, because, especially in the case of parts in-mold coated by an injection-molding process, or in the case of multilayer films, cracks of this type can propagate within the layers situated thereunder and can thus cause breakdown of the part.

The above objects and other objects have been achieved by the present invention the first embodiment of which includes a polyamide molding composition, comprising:

a) at most 90 parts by weight of a polyamide obtained from a lactam or from an amino carboxylic acid having at least 10 carbon atoms; and b) from 10 to 100 parts by weight of PA1010, wherein a total of components a) and b) is 100 parts by weight.

In another embodiment, the present invention relates to a printable or printed item, comprising the above molding composition.

In yet another embodiment, the present invention relates to a composite part, comprising the above printable or printed item, and a substrate.

The present invention also relates to a process for producing a composite part as above, comprising:

producing the composite part via adhesive bonding, coextrusion, pressing, lamination, or in-mold coating by an injection-molding, compression-molding, or foaming process, and optionally, via subsequent forming.

DETAILED DESCRIPTION OF THE INVENTION

Surprisingly, the objects of the present invention were achieved via the use of a polyamide molding composition which comprises the following components:

a) at most 90 parts by weight of a polyamide obtainable from a lactam or from an amino carboxylic acid having at least 10 carbon atoms; and b) from 10 to 100 parts by weight of PA1010, where components a) and b) give a total of 100 parts by weight, for production of a printable or printed item.

The amount of component a) includes all values and subvalues therebetween, especially including 10, 20, 30, 40, 50, 60, 70 and 80 parts by weight. The amount of component b) includes all values and subvalues therebetween, especially including 10, 20, 30, 40, 50, 60, 70, 80 and 90 parts by weight.

In one preferred embodiment, the printable or printed item is a single- or multilayer film. However, other products suitable in principle for printing, e.g. by the thermal diffusion process, are injection-molded parts, and also hollow products manufactured via blow molding.

The present invention also provides the items produced from this molding composition; semifinished products, such as thermoplastically formable films for subsequent in-mold coating by an injection-molding or foaming process, are also provided by the present invention.

The polyamide used as component a) is generally PA10, PA11, or PA12. In one preferred embodiment, its amount present in the molding composition is at least 0.1 part by weight, at least 1 part by weight, at least 5 parts by weight, or at least 10 parts by weight.

In one preferred embodiment, the crystallite melting point $T_m$, of the polyamide molding composition is in the range from 180 to 210° C., particularly preferably in the range from 185 to 205° C., and with particular preference in the range from 190 to 200° C. The crystallite melting point $T_m$ includes all values and subvalues therebetween, especially including 185, 190, 195, 200 and 205° C. When component a) is present, it is possible to discern a second crystallite melting point deriving therefrom; there may be some or complete coalescence of the two crystallite melting points. The enthalpy of fusion of the polyamide blend is moreover preferably at least 50 J/g, particularly preferably at least 60 J/g, and with particular preference at least 70 J/g. $T_m$ and enthalpy of fusion are determined in the 2nd heating curve with a heating rate of 20 K/min, via DSC to ISO 11357.

The relative solution viscosity $\eta_{rel}$ of the polyamide blend, measured on a 0.5% strength by weight solution in m-cresol at 23° C. to ISO 307, is generally from about 1.5 to about 2.5, preferably from about 1.7 to about 2.2, and particularly preferably from about 1.8 to about 2.1. The relative solution viscosity $\eta_{rel}$ includes all values and subvalues therebetween, especially including 1.6, 1.7, 1.8, 1.9, 2.0, 2.1, 2.2, 2.3 and 2.4. In one preferred embodiment, the melt viscosity, measured in a mechanical spectrometer (cone-and-plate) to ASTM D4440 at 240° C. and at a shear rate of 100 $s^{-1}$, is from 250 to 10 000 Pas, preferably from 350 to 8 000 Pas, and particularly preferably from 500 to 5 000 Pas. The melt viscosity includes all values and subvalues therebetween, especially including 500, 1000, 1500, 2000, 2500, 3000, 3500, 4000, 4500, 5000, 5500, 6000, 6500, 7000, 7500, 8000, 8500, 9000 and 9500 Pas.

The molding composition may optionally comprise other components, such as the familiar auxiliaries and additives, the amounts of these being those conventional in polyamide molding compositions, examples being stabilizers, lubricants, dyes, or nucleating agents.

This molding composition can be used for production of items, such as moldings or films, and these are also provided by the present invention. In one preferred embodiment, the thickness of the films or multilayer films is from 0.02 to 1.2 mm, particularly preferably from 0.05 to 1 mm, very particularly preferably from 0.1 to 0.8 mm, and with particular preference from 0.2 to 0.6 mm. The thickness of the films or multilayer films includes all values and subvalues therebetween, especially including 0.05, 0.1, 0.2, 0.3, 0.4, 0.5, 0.6, 0.7, 0.8, 0.9, 1 and 1.1 mm. If the material is a multilayer film, in one preferred embodiment the thickness of the layer comprising the inventive molding composition, generally the outer layer, is from 0.01 to 0.5 mm, particularly preferably from 0.02 to 0.3 mm, very particularly preferably from 0.04 to 0.2 mm, and with particular preference from 0.05 to 0.15 mm. The film is produced by means of known methods, such as extrusion, or, in the case of multilayer systems, via coextrusion or lamination.

The following embodiments are preferred in the case of a multilayer film:

1. The multilayer film comprises a further layer comprising a polyamide elastomer molding composition, in particular of a polyetheramide or of a polyetheresteramide, and preferably of a polyetheramide or polyetheresteramide on the basis of a linear aliphatic diamine having from 6 to 18, preferably from 6 to 12 carbon atoms, a linear aliphatic or an aromatic dicarboxylic acid having from 6 to 18, preferably from 6 to 12 carbon atoms, and of a polyether having an average of more than 2.3 carbon atoms per oxygen atom and having a number-average molecular weight of from 200 to 2000. The number-average molecular weight includes all values and subvalues therebetween, especially including 300, 400, 500, 600, 700, 800, 900, 1000, 1100, 1200, 1300, 1400, 1500, 1600, 1700, 1800 and 1900. The molding composition of this layer may comprise other blend components, e.g. polyacrylates or polyglutarimides having carboxy or carboxylic anhydride groups or epoxy groups, a rubber containing functional groups, and/or a polyamide. Molding compositions of this type are described by way of example in EP 1 329 481 A2 and DE-A 103 33 005, expressly incorporated herein by way of reference. In order to ensure good layer adhesion it is advantageous here for the polyamide content of the polyamide elastomer to comprise monomers identical with those used in component a) or b) of the other layer.

2. The multilayer film comprises an adhesion promoter layer for linkage to the substrate or for bonding within the multilayer film structure, for example a polyolefin functionalized with carboxy groups or with anhydride groups or with epoxy groups, a blend comprising the undermost-layer material and of the substrate material, or a thermoplastic polyurethane.

3. The undermost layer of the film comprises a hard backing layer, e.g. comprising an aliphatic or cycloaliphatic homo- or copolyamide or of a polymethacrylate copolymer or polymethacrylimide copolymer, and this layer inhibits expression of glass fibers or carbon fibers when a fiber-filled molding composition is used for in-mold coating by an injection-molding process.

These embodiments may also be combined with one another. It is preferable that the layer comprising the polyamide blend used according to the present invention forms the outer layer. If necessary, for example if there are increased scratch resistance requirements, this outer layer may, if appropriate, also have a protective layer, for example a polyurethane-based clear lacquer. It may also, if appropriate, have been covered with an assembly film which is peeled away after production of the finished part.

The moldings to be decorated with this film can be produced separately in an upstream manufacturing step, e.g. via injection molding, or can be produced via in-mold coating of an unprinted or printed film, by an injection-molding or foaming process; in this case, the imprinted or printed film is placed in the injection mold.

The second layer which is the underlayer or which, if there are more than 2 layers, is one of the underlayers, may be a colorless transparent layer, a transparent colored layer, or else an opaque colored layer, in order to permit generation of specific design variants in combination with the transparent outer layer. In these cases, the transparent outer layer can also be printed from the upper side.

In a preferred embodiment, the film is a decorative film. For the purposes of the present invention, decorative films are films which can be printed and/or comprise a color layer, and moreover are intended for bonding to a substrate in order to decorate its surface. The decoration can also be brought about by using a lamination process on visual surface defects, e.g. by hiding surface roughness deriving from fillers or from reinforcing materials.

Examples of the use of the films are as protective film with respect to soiling, UV radiation, weathering effects, chemicals, or abrasion, as barrier film on vehicles, in the household, on floors, on tunnels, on tents, and on buildings, or as a carrier for decorative effects, for example for topcoats on sports equipment, or internal or external decoration on motor vehicles, on boats, in the household, or on buildings. These possible uses also apply to cases in which the molding composition is an opaque colored composition. Examples of methods for producing the cohesive bond between film and substrate are adhesive bonding, pressing, lamination, coextrusion, or in-mold coating by an injection-molding, foaming, or compression-molding process. To achieve improved adhesion, the film may be pre-flame-treated or pre-plasma-treated, for example. Prior to formation of the bond between film and substrate, the film can also be subjected to forming or to other operations, for example via thermoforming or other processes. By way of example, the surface can be structured via embossing. Structuring of the surface is also possible upstream in the context of film extrusion, for example via specifically designed rolls. The resultant composite part can then again be subjected to forming processes.

Examples of suitable substrates are molding compositions based on polyolefins, on polyamides, on polyesters, on polycarbonates, on ABS, on polystyrene, or on styrene copolymers.

In one preferred embodiment, the inventive film is used as outer layer of a film composite for the design or decoration of surfaces on or in automobiles and utility vehicles, the film having been adhesive-bonded to a plastics substrate. The correspondingly designed component can be of sheet-like shape, examples being a bodywork part, such as a roof module, wheel surround, engine cover, or door. Other preferred embodiments are those in which elongate components with a relatively high or relatively low degree of curvature are produced, examples being cladding, such as the cladding of what are known as A columns on an automobile, or decorative and cover strips of any kind. Protective cladding for doorsteps are another example. Alongside applications in motor vehicle exteriors, it is also possible to use the inventive films to decorate constituents of the interior with advantage, particular examples being decorative elements such as strips and panels, because good decoratability and resistance to chemicals, such as cleaners, is also required in the interior.

In another preferred embodiment, the inventive film is used as topcoat for any type of snowboard-like equipment, such as skis or snowboards.

U.S. Pat. No. 5,437,755 describes a known process for applying decorated ski topcoats. In this process, the ski is produced by what is known as the monocoque system, the topcoat initially comprising two plastics films of which the outer is transparent and the inner is opaque (white). Before the two films are adhesive-bonded to one another, and before the subsequent thermoforming process, the outer side of the transparent upper film and one of the subsequent contact surfaces between the transparent upper film and the opaque lower film are printed with various decorative effects. Suitable plastics stated for the upper film are acrylonitrile-butadiene-styrene copolymer (ABS), acrylonitrile-styrene copolymer (AS), thermoplastic polyurethane (TPU), and aliphatic polyamides, particularly PA11 and PA12. Materials described only for the lower film, which is protected from external effects and is not always printed, are copolyamides, alongside polyetheramides, polyetheramides, modified polyolefins, and styrene-carboxylic anhydride copolymers. However, any of the other known shaping and adhesive-bonding processes may be used to bond the topcoat to the ski or snowboard.

If a monofilm is used, this is transparent and is preferably underside-printed, and in this case a white adhesive or, if appropriate, an adhesive of different color, is used as optical background for bonding the film to the ski.

If a coextruded two-layer film is used, this preferably comprises a transparent overlayer and a white- or color-pigmented underlayer as background, the upper side of the film having been printed.

Having generally described this invention, a further understanding can be obtained by reference to certain specific examples which are provided herein for purposes of illustration only, and are not intended to be limiting unless otherwise specified.

EXAMPLES

Examples are used below to illustrate the invention. The preparation of the individual underlying polyamides is known to the person skilled in the art and takes place by way of example as in DE-A 20 44 105 (PA1010 or PA11), and DE-A 21 52 194 (PA12, and copolyamides).

Inventive Example 1

To prepare a PA 1010, a 200-1 stirred autoclave was supplied with the following starting materials:
35.976 kg of 1,10-decanediamine (in the form of an 89.5% strength aqueous solution),
38.251 kg of sebacic acid, and also
8.5 g of a 50% strength aqueous solution of hypophosphorous acid (corresponds to 0.006% by weight).

The starting materials were melted under nitrogen and heated, with stirring, to about 220° C. in the sealed autoclave, the resultant internal pressure being about 20 bar. This internal pressure was maintained for 2 hours; the melt was then further heated to 270° C. with continuous depressurization to atmospheric pressure, and then kept at this temperature in a stream of nitrogen for 1.5 hours. The system was then depressurized to atmospheric pressure within a period of 3 hours, and nitrogen was passed over the melt for a further 3 hours until the torque indicated no further rise in melt viscosity. The melt was then discharged by means of a gear pump and strand-pelletized. The pellets were dried at 80° C. under nitrogen for 24 hours.
Yield: 65 kg
The properties of the product were as follows:
Crystallite melting point $T_m$: 192° C. and 204° C.
Enthalpy of fusion: 78 J/g
Relative solution viscosity $\eta_{rel}$: 1.76

Inventive Example 2

In an identical reactor, Inventive Example 1 was repeated with the following starting materials:
35.976 kg of 1,10-decanediamine (in the form of an 89.5% strength aqueous solution),
38.251 kg of sebacic acid, and also
8.5 g of a 50% strength aqueous solution of hypophosphorous acid (corresponds to 0.006% by weight).
Yield: 63 kg
The properties of the product were as follows:
Crystallite melting point $T_m$: 191° C. and 203° C.
Enthalpy of fusion: 73 J/g
Relative solution viscosity $\eta_{rel}$: 1.81

To raise the relative solution viscosity to 2.23, the pellets discharged were solid-phase-postcondensed under nitrogen for 24 hours in a tumbling dryer with jacket temperature of 165° C.

Comparative Example 1

A copolyamide was prepared as in the known art, comprising 80 mol % of laurolactam and 20 mol % of caprolactam. The relative solution viscosity $\eta_{rel}$ was 1.9.
Crystallite melting point $T_m$: 158° C.
Enthalpy of fusion: 46 J/g Comparative Example 2

A copolyamide was prepared as in the known art, comprising 80 mol % of laurolactam and 20 mol % of an equimolar mixture comprising hexamethylenediamine and 1,12 dodecanedioic acid, its $\eta_{rel}$ being 1.89.
Crystallite melting point $T_m$: 155° C.
Enthalpy of fusion: 42 J/g Comparative Example 3

A copolyamide was prepared as in the known art, comprising 85 mol % of laurolactam, 7.5 mol % of isophoronediamine, and 7.5 mol % of 1,12-dodecanedioic acid, its $\eta_{rel}$ being 1.85.
Crystallite melting point $T_m$: 158° C.
Enthalpy of fusion: 54 J/g Comparative Example 4

A homopolyamide was prepared, comprising laurolactam, its $\eta_{rel}$ being 1.95.
Crystallite melting point $T_m$: 178° C.
Enthalpy of fusion: 73 J/g Inventive Example 3

Blend comprising PA1010+PA12 30/70% by weight
The pellets from Inventive Example 1 and Comparative Example 4 were mixed with 0.5% by weight of the bis(3,5-tert-butyl-4-hydroxyphenylcinnamic) amide of hexamethylenediamine (IRGANOX 1098® from Ciba Additives GmbH) and melted in a Werner & Pfleiderer ZSK 30 twin-screw extruder with a barrel temperature of 250° C. and a rotation rate of 250 rpm.
The properties of the polyamide mixture were as follows:
Crystallite melting point $T_m$: 171° C. and 190° C.
Enthalpy of fusion: 65 J/g
Relative solution viscosity $\eta_{rel}$: 1.96

Inventive Examples 4 to 7

The following blends were prepared by analogy with Inventive Example 3:

| Inventive Example | PA1010 + PA12 [% by weight] | Rel. solution viscosity $\eta_{rel}$ | Melting point $T_m$ [° C.] | Enthalpy of fusion [J/g] |
|---|---|---|---|---|
| 4 | 20/80 | 1.99 | 172/185 | 61 |
| 5 | 40/60 | 1.96 | 168/190 | 63 |
| 6 | 50/50 | 1.93 | 179/192 | 67 |
| 7 | 60/40 | 1.88 | 161/187/197 | 74 |

Inventive Examples 8 and 9

By analogy with Inventive Example 3, the following blends were prepared, comprising PA1010 of Inventive Example 2 and PA11 of relative solution viscosity $\eta_{rel}$ 1.80:

| Inventive Example | PA1010 + PA11 [% by weight] | Rel. solution viscosity $\eta_{rel}$ | Melting point $T_m$ [° C.] | Enthalpy of fusion [J/g] |
|---|---|---|---|---|
| 8 | 30/70 | 1.80 | 179/187 | 64 |
| 9 | 70/30 | 1.80 | 165/189 | 73 |

A Collin film system was used to extrude, print, and assess films of thickness 0.3 mm comprising the products of Inventive Examples 1-9, and also of the Comparative Examples 1-4. Gloss was determined on 1 mm injection-molded plaques. The results are shown in the table below.

In the case of the molding compositions with poor processability, severe warpage was noticeable via the slow post-crystallization.

The monofilms of thickness 300 μm produced by way of the calender method were printed by way of the sublimation printing process. For this, a transfer paper (Accuplot EPQ DIN A4, or EPSON Photo quality DIN A4) was printed with a mirror image of the desired print motif, using sublimation inks (Rotech, Printer: EPSON C84), and its printed side was placed on the film to be printed. The print procedure was carried out [at T=145° C. to 175° C., t=2 to 5 min; p (pressure)=1.1 N/cm (110 mbar)] in a temperature-controlled press by closing the press (Meyer HM bench fixing press), only the upper press platen being temperature-controlled here. The print procedure concluded with removal of the film and removal of the transfer paper.

TABLE

Assessment of molding compositions

| Molding composition composed of | Transparency | Processability on film extrusion | Gloss (angle of incidence 20°) | Printing (temperature/time); character sharpness | Contrast |
|---|---|---|---|---|---|
| Comparative Example 1 | good | poor, severe warpage | 80 | 145° C./10 min | moderate |
| Comparative Example 2 | good | poor, severe warpage | 85 | 145° C./10 min | moderate |
| Comparative Example 3 | good | poor, severe warpage | 95 | 145° C./10 min | moderate |
| Comparative Example 4 | poor | moderate, warpage | 90 | 160° C./5 min | good |
| Inventive Examples 1 and 2 | very good | good | 95 | 175° C./2 min | very good |
| Inventive Examples 3 to 9 | very good | good | 100-125 | 175° C./2 min | very good |

All of the films from Inventive Examples 1 to 9 could be decorated by means of thermal diffusion print, but the films of Comparative Examples 1 to 4 were deformed to some extent during the process. A surprisingly high gloss was found in Inventive Examples 1 to 9.

German patent application 10 2005 026 264.3 filed Jun. 8, 2005, is incorporated herein by reference.

Numerous modifications and variations on the present invention are possible in light of the above teachings. It is therefore to be understood that within the scope of the appended claims, the invention may be practiced otherwise than as specifically described herein.

The invention claimed is:

1. A composite part, comprising:
   a printable or printed item which is a single- or multilayer film, and
   a substrate having the printable or printed item thereon,
      wherein the printable or printed item comprises a polyamide molding composition consisting of:
      a) at most 90 parts by weight of a polyamide obtained solely from a lactam having at least 10 carbon atoms, or solely from an amino carboxylic acid having at least 10 carbon atoms;
      b) from 10 to 100 parts by weight of PA1010, and
      c) optionally, one or more auxiliaries or additives selected from the group consisting of stabilizers, lubricants, dyes, and nucleating agents;
   wherein the total of components a) and b) is 100 parts by weight,
   wherein the printable or printed item has a thickness of from 0.02 to 1.2 mm.

2. The composite part of claim 1, wherein the polyamide molding composition comprises PA10, PA11, or PA12 as the component a).

3. The composite part of claim 2, wherein the component a) is PA 12 and is present in an amount of from 40 to 80 parts by weight.

4. The composite part of claim 2, wherein the component a) is PA 11 and is present in an amount of from 30 to 70 parts by weight.

5. The composite part of claim 1, wherein the polyamide molding composition has a crystallite melting point $T_m$ of at least 180° C.

6. The composite part of claim 1, wherein the polyamide molding composition has a crystallite melting point $T_m$ of at least 190° C.

7. The composite part of claim 1, wherein the polyamide molding composition has a crystallite melting point $T_m$ of at least 195° C.

8. The composite part of claim 1, wherein the printable or printed item is obtained via extrusion, blow molding, or injection molding.

9. The composite part of claim 1, wherein the printable or printed item comprises at least one underlayer,
   wherein each underlayer is independently selected from the group consisting of polyamide elastomers, polyamides, copolyamides, adhesion promoters, and mixtures thereof.

10. The composite part of claim 9, wherein at least one underlayer is transparent or opaque.

11. The composite part of claim 1, wherein the printable or printed item is a multilayer film and the layer comprising the molding composition is has a thickness of from 0.01 to 0.5 mm.

12. The composite part of claim 1, comprising the printable item.

13. The composite part of claim 1, comprising the printed item.

14. The composite part of claim 1, wherein the printable or printed item is a single layer film.

15. The composite part of claim 1, wherein the printable or printed item is a multi layer film.

16. The composite part of claim 1, wherein the polyamide molding composition comprises at least 1 part by weight of the component a).

17. The composite part of claim 1, wherein the polyamide molding composition comprises at least 5 part by weight of the component a).

18. The composite part of claim 1, wherein the polyamide molding composition comprises at least 10 part by weight of the component a).

19. A motor vehicle interior or a bodywork part of a motor vehicle, comprising the composite part according to claim 1.

* * * * *